(12) United States Patent
Shang et al.

(10) Patent No.: US 12,118,667 B2
(45) Date of Patent: Oct. 15, 2024

(54) METHODS AND SYSTEMS FOR UNIFIED RENDERING OF LIGHT AND SOUND CONTENT FOR A SIMULATED 3D ENVIRONMENT

(71) Applicant: Verizon Patent and Licensing Inc., Basking Ridge, NJ (US)

(72) Inventors: Tom Hsi Hao Shang, Forest Hills, NY (US); Liang Luo, Nutley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 179 days.

(21) Appl. No.: 17/838,992

(22) Filed: Jun. 13, 2022

(65) Prior Publication Data
US 2023/0401789 A1   Dec. 14, 2023

(51) Int. Cl.
*G06T 17/10* (2006.01)
*G06T 15/50* (2011.01)
*H04S 7/00* (2006.01)

(52) U.S. Cl.
CPC .............. *G06T 17/10* (2013.01); *G06T 15/50* (2013.01); *H04S 7/302* (2013.01); *H04S 2400/11* (2013.01)

(58) Field of Classification Search
CPC ......... G06T 17/10; G06T 15/50; H04S 7/302; H04S 2400/11
See application file for complete search history.

(56) References Cited

U.S. PATENT DOCUMENTS

| | | | |
|---|---|---|---|
| 2001/0014891 A1* | 8/2001 | Hoffert | G06F 16/951 |
| 2019/0180499 A1* | 6/2019 | Caulfield | G06V 20/17 |
| 2021/0329405 A1* | 10/2021 | Eubank | H04S 7/305 |
| 2022/0215635 A1* | 7/2022 | Meouchy | G06T 19/20 |

* cited by examiner

*Primary Examiner* — Michelle Chin

(57) ABSTRACT

An illustrative audiovisual content rendering system generates a light dataset configured to model light energy at a particular location within a simulated 3D environment for a video frame time. The audiovisual content rendering system also generates an audio dataset configured to model acoustic energy at the particular location within the simulated 3D environment for an audio frame time concurrent with the video frame time. The audiovisual content rendering system stores the light dataset and the audio dataset together within a voxel-based data structure. More particularly, the light dataset and the audio dataset are stored together within a particular voxel of the voxel-based data structure that corresponds to the particular location within the simulated 3D environment. Corresponding methods and systems are also disclosed.

20 Claims, 10 Drawing Sheets

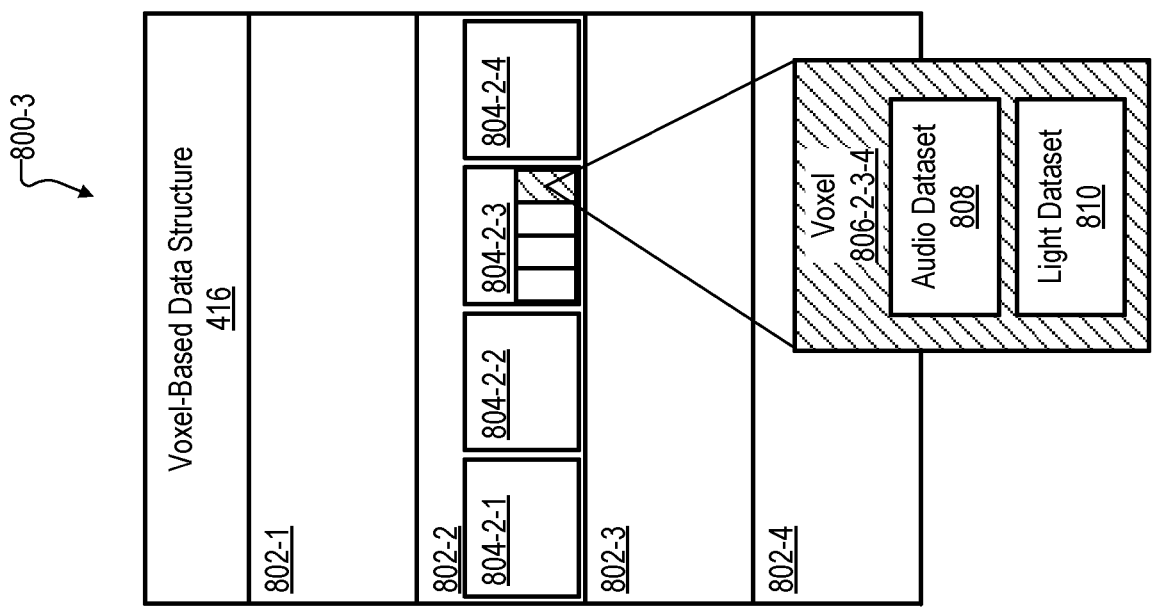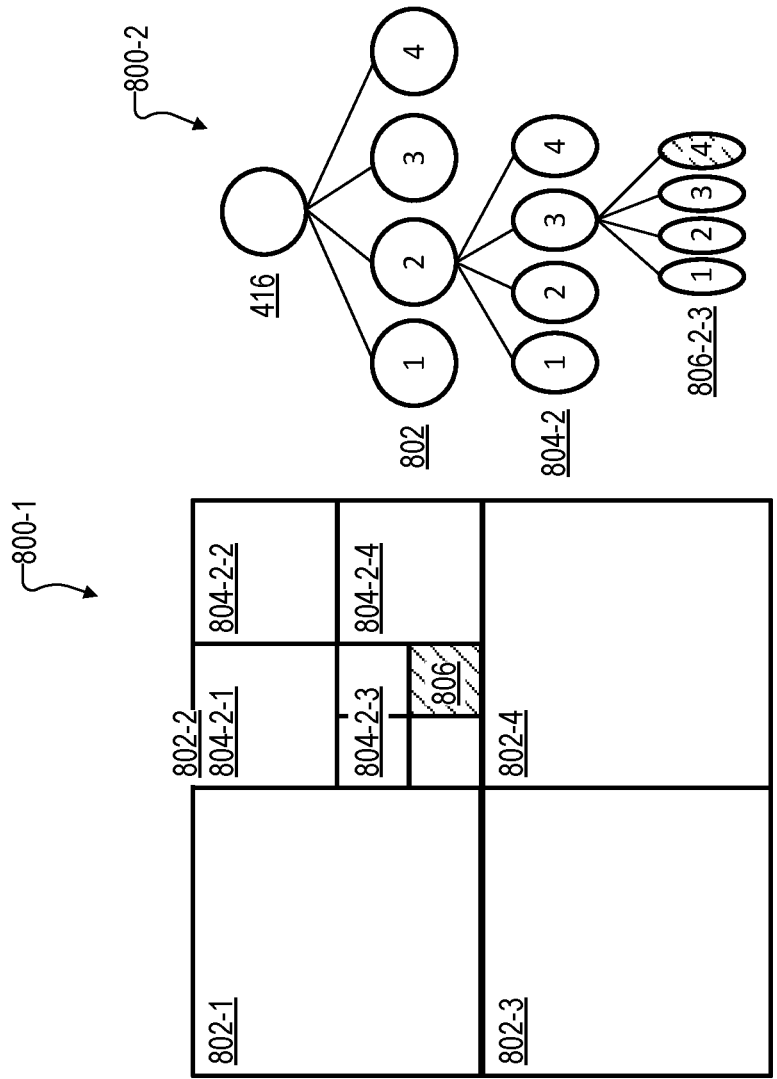
Fig. 8 ns and systems for unified rendering of light and sound content for a simulated 3D environment

BACKGROUND INFORMATION

Three-dimensional (3D) environments and various objects within them are simulated for a variety of entertainment, communication, educational, occupational, promotional, and/or other applications and use cases. For example, by modeling 3D objects such as human subjects, animal subjects, furnishings and other inanimate objects, walls, floors, ceilings, and so forth within a virtual or real-world room, extended reality content (e.g., virtual reality content, augmented or mixed reality content, etc.) that simulates the virtual or real-world room may be generated. This extended reality content may then be presented to a user to provide the user an extended reality experience (e.g., a virtual reality experience, an augmented or mixed reality experience, etc.) within that simulated environment. Such experiences may be provided as part of extended reality applications, social media programs, video games, film special effects, educational materials, or the like.

While great advances have been made in recent years to achieve realistic and lifelike visual simulations of 3D environments and the objects included therein, development of highly realistic and lifelike acoustic simulation has largely remained stagnant. As a result, modern simulated 3D environments may exhibit photorealistic graphics created using highly advanced lighting effects and shading techniques while having relatively primitive audio that is the same throughout the simulated 3D environment or that is mixed in relatively rudimentary ways (e.g., adjusting the volume of various sound sources based on their proximity within the environment to a listener). Extended reality experiences would be more enjoyable and immersive if simulated audio achieved similar levels of lifelike quality and immersive realism as simulated graphics have achieved.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 8 shows illustrative views of a voxel-based data structure within which light and audio datasets may be stored as part of a unified rendering of light and sound content for a simulated 3D environment.

DETAILED DESCRIPTION OF EXAMPLE EMBODIMENTS

Figure 1:
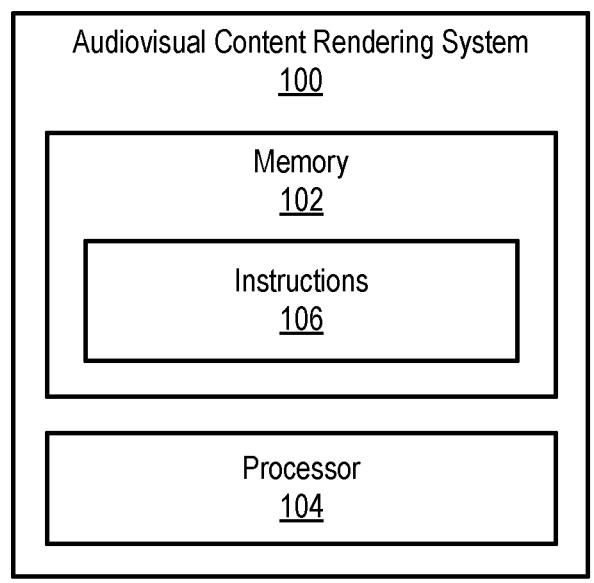
FIG. 1 shows an illustrative audiovisual content rendering system for unified rendering of light and sound content for a simulated 3D environment.

Methods and system for unified rendering of light and sound content for a simulated three-dimensional (3D) environment are described herein. The rendering of light content and sound content described herein is "unified" in the sense that the rendering leverages the insight that both light and sound can be modeled as energy (e.g., wave energy) that propagates through an environment and interacts with air and different types of surfaces in the environments in identical, similar, or at least analogous ways. For example, electromagnetic energy making up light may travel from a light source through the air more or less unhindered until the light reaches a surface of an object, whereupon the light energy may be absorbed, reflected, refracted, scattered, and/or otherwise affected depending on various characteristics of the light (e.g., the chrominance and/or luminance of the light, etc.) and/or characteristics of the surface (e.g., the color and texture of the surface, etc.). Similarly, acoustic energy making up sound may travel from a sound source through the air more or less unhindered until the sound reaches a surface of an object, whereupon the acoustic energy may be absorbed, reflected, refracted, scattered, and/or otherwise affected depending on various characteristics of the sound (e.g., the frequency and/or volume of the sound, etc.) and/or characteristics of the surface (e.g., the texture of the surface, the material from which the surface is constructed, etc.).

The similarities in how light and sound interact with objects in the environment may allow for both of these types of energy (e.g., as well as other types of energy such as heat energy, the energy of electrical and/or magnetic fields, energy waves from non-visible frequencies of electromagnetic radiation, etc.) to be simulated and rendered using similar techniques, algorithms, modeling equations, storage strategies, and so forth. For example, as will be described in more detail below, generalized spherical harmonics functions may be useful for modeling and rendering both light and sound to simulate how these two types of energy may both project from respective sources, reflect from different types of surfaces, diffract around edges of objects, diffuse through space, and so forth. Accordingly, significant advancements and efficiencies may be achieved by operating acoustic models of a simulated space simultaneously and in parallel with light models of the space (which, as noted above, may already be configured to take advantage of advanced simulation techniques). Both sound and light models may be operated, for instance, based on the same set of inputs (e.g., inputs describing the geometry of the simulated space, the surfaces within it and their characteristics, etc.) to produce parallel datasets (one for light and one for sound) that may be stored and processed together in effective ways that have largely been leveraged only for graphics in the past. For example, a light dataset and an audio dataset that model their respective types of energy using similar techniques (e.g., based on generalized spherical harmonics equations, etc.) may be stored together in a single voxel-based data structure in a manner that makes both visual and audio effects equally dependent on or sensitive to the location within the environment from which the audiovisual content is being experienced.

In operation, for example, a light dataset representing how light may interact and/or be experienced from a particular location within a simulated 3D environment may be computed and stored in a voxel corresponding to that particular location within a voxel-based data structure. Rather than modeling and simulating sound separately from this modeling of the light at the particular location, acoustic energy associated with the sound at the particular location may be analyzed in a mathematically similar way as the light (e.g., using similar spherical harmonics functions, etc.) and an audio dataset specific to that particular location may be stored with the light dataset in the same voxel of the same voxel-based data structure. In some examples, a light model may be converted to create the sound model (due to similarities in light and acoustic energy propagation that have been described) such that all the advances that have accrued to light processing may be used to benefit sound processing without the added processing work of analyzing sound separately from light. For instance, if both light and sound models use spherical harmonics in their respective calculations, a unifying rendering equation may be used to generate the light dataset and the audio dataset, and both of these may be stored and organized in the same voxel-based data structure in a location-dependent manner.

At render time, the light dataset may then be rendered to create certain lighting effects while the audio dataset may be rendered to create accurate and lifelike spatial sound (e.g., 3D sound specific to the particular location). Accordingly, when a user moves his or her avatar within a simulated 3D environment from one location to another, or when different users have their avatars at different locations within the simulated 3D environment, both the lighting effects and the spatial sound will be customized to the different locations so that realistic, location-customized light and sound can be presented to users based on the locations of their avatars within the simulated 3D environment.

Various advantages and benefits may be provided by methods and systems described herein for unified rendering of light and sound content for a simulated 3D environment. For example, spatial audio rendered and presented to the user in accordance with methods and systems described herein may be significantly more immersive and responsive to the user's position and movement within a simulated 3D environment than conventional audio presented within virtual spaces. At the same time, the processing requirements for storing, accessing, and processing audio and visual content may be dramatically reduced due to the parallel nature of the audio and visual processing (e.g., unified spherical harmonics equations, etc.) and/or the unified data structure (e.g., the voxel-based data structure) within which computed light and audio datasets are stored and managed. As a result, significant improvements in audiovisual quality, processing latency and efficiency, and general immersiveness of experience may be achieved. Moreover, along with the efficiencies resulting from unifying light and audio datasets within a single data structure, the correlation and organization of light and audio datasets in this way may also yield data that, when leveraged by machine learning technologies or the like, may lead to useful predictions and/or insights (e.g., what a particular piece of furniture constructed from a particular virtual material "sounds like", how the lip movements of a particular speaker correlate to the sound originating from that speaker, etc.).

Various specific implementations will now be described in detail with reference to the figures. It will be understood that the specific implementations described below are provided as non-limiting examples and may be applied in various situations. Additionally, it will be understood that other examples not explicitly described herein may also be captured by the scope of the claims set forth below. Methods and systems described herein for unified rendering of light and sound content for a simulated 3D environment may provide any of the benefits mentioned above, as well as various additional and/or alternative benefits that will be described and/or made apparent below.

FIG. 1 shows an illustrative audiovisual content rendering system 100 ("system 100") for unified rendering of light and sound content for a simulated 3D environment (e.g., a virtual reality environment, an augmented reality environment, etc.). System 100 may be implemented by computer resources such as processors, memory facilities, storage facilities, communication interfaces, and so forth. For example, as will be described in more detail below, system 100 may be partially or fully implemented within audiovisual presentation devices used by end users (e.g., user equipment (UE) devices, head-mounted or hand-held extended reality presentation devices, mobile devices such as smartphones or tablet devices, personal computers, or other equipment used directly by end users); by server-side, multi-access computing systems separate from the audiovisual presentation devices; by a combination of any of these; or by any other suitable computing systems as may serve a particular implementation. In some examples, at least part of system 100 may be implemented by distributed computing systems operated by a cellular data provider (e.g., multi-access edge compute (MEC) systems), distributed computing systems operated by a cloud-computing provider (e.g., multi-access cloud compute systems), or by other such distributed computing systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general-purpose processors (e.g., central processing units (CPUs), graphics processing units (GPUs), microprocessors, etc.), special-purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with unified rendering of light and sound content for a simulated 3D environment in accordance with methods and systems described herein and/or as may serve a particular implementation.

Figure 2:
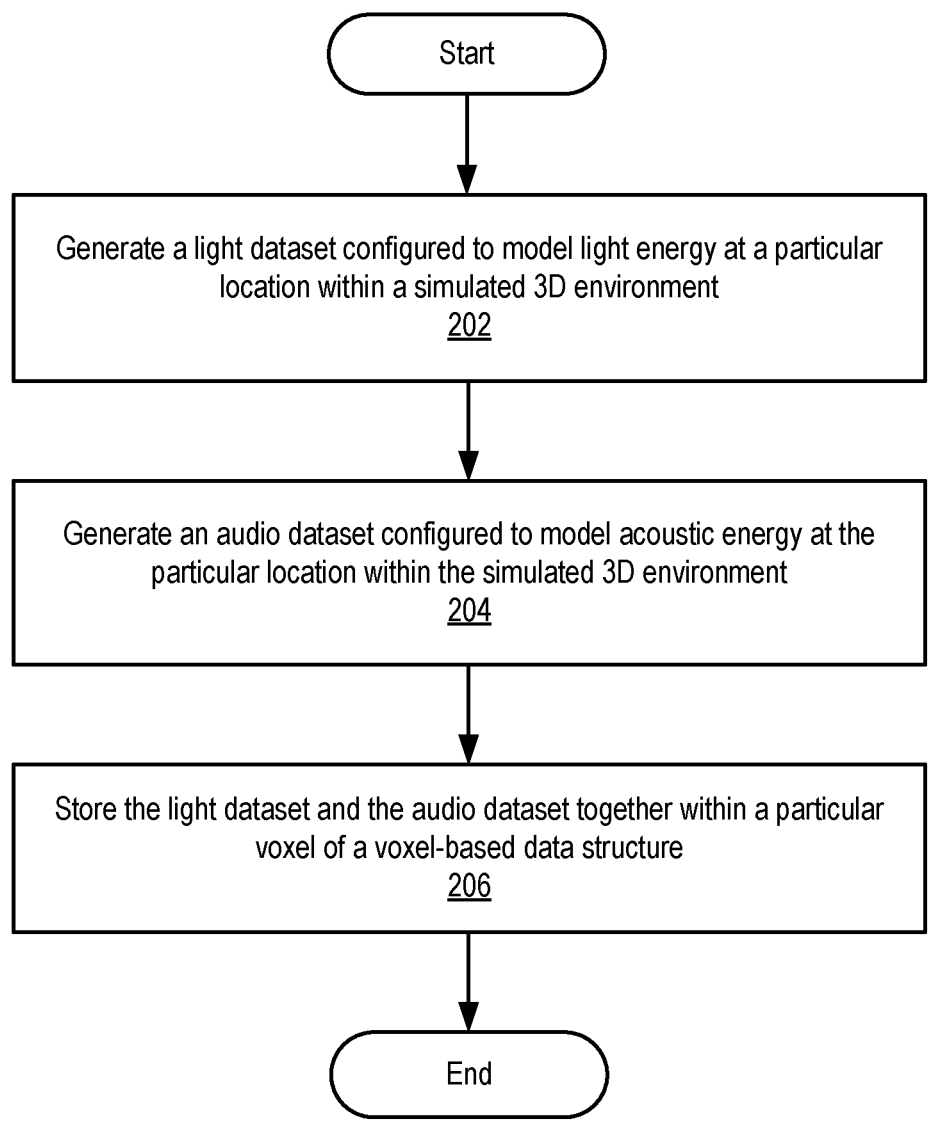
FIG. 2 shows an illustrative method that facilitates a unified rendering of light and sound content for a simulated 3D environment.

As one example of functionality that processor 104 may perform, FIG. 2 shows an illustrative method 200 that facilitates a unified rendering of light and sound content for a simulated 3D environment. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by an audiovisual content rendering system such as system 100 and/or any implementation thereof.

In certain examples, operations of method 200 may be performed efficiently and quickly, but, prioritizing the realism and quality of resulting renderings and simulations, may not necessarily be performed in real time. In other examples, operations of method 200 may be performed in real time so as to provide, receive, process, and/or use data described herein immediately as the data is generated, updated, changed, exchanged, or otherwise becomes available (e.g., simulating a virtual 3D environment that tracks a real 3D environment in real time). In such examples, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-206 of method 200 will now be described in more detail as the operations may be performed by an implementation of system 100 (e.g., by processor 104 executing instructions 106 stored in memory 102).

At operation 202, system 100 may generate a light dataset configured to model light energy at a particular location within a simulated 3D environment. For example, as will be described and illustrated in more detail below, a simulated 3D environment may be partitioned into a 3D grid in which each cube in the grid is considered to be a unique location within the simulated 3D environment. Accordingly, for a particular location associated with a particular one of these cubes, the interaction of light with any surfaces contained within the cube may be modeled and computed using techniques and algorithms configured for this purpose (e.g., spherical harmonics functions, rendering equations, etc.). Data resulting from these computations may model how light energy is to be presented for the particular location, and similar computations may be made to model light energy at other locations within the simulated 3D environment (e.g., based on surfaces in other cubes of the grid, etc.). The light dataset generated at operation 202 may thus be understood to include data computed for the light energy at the particular location and analogous light datasets (not explicitly referred to in FIG. 2) will be understood to also optionally be computed at this step.

At operation 204, system 100 may generate an audio dataset configured to model acoustic energy at the particular location (i.e., the same particular location referred to above for the light dataset generated at operation 202) within the simulated 3D environment. As described above for the light dataset, the audio dataset generated at operation 204 will be understood to include data computed for acoustic energy at the particular location and analogous audio datasets (not explicitly referred to in FIG. 2) may also be computed at this step. For instance, these additional audio datasets may correspond to other locations (e.g., other cubes within the 3D grid) for which respective light datasets have also been generated.

For a dynamic simulated 3D environment, light and sound virtually propagating through the environment will change continuously (e.g., as people and objects move, make sounds, talk, etc.). Accordingly, both the light dataset of operation 202 and the audio dataset of operation 204 may be generated for a particular frame time. For example, the light dataset generated at operation 202 may be generated for a video frame time (e.g., a particular time period of $\frac{1}{30}^{th}$ of a second if a video frame rate is 30 frames per second (fps)), while the audio dataset generated at operation 204 may be generated for an audio frame time that is concurrent with the video frame time. As will be described in more detail below, the audio frame time and video frame time may be the same length (e.g., $\frac{1}{30}^{th}$ of a second in the example above) and may overlap in a one-to-one manner in certain examples such that each location (e.g., each cube of a 3D grid into which a simulated 3D environment is divided) is associated with a certain number of light datasets and audio datasets (e.g., 30 of each) for each second in which the 3D environment is simulated. In other examples, the audio frame time may be distinct from (e.g., based on or independent from) the video frame time such that the concurrent frame times overlap in ways other than a one-to-one manner (e.g., two audio frame times overlap with a single video frame time, two video frame times overlap with a single audio frame time, etc.).

At operation 206, system 100 may store the light dataset and the audio dataset together within a particular voxel of a voxel-based data structure. For example, the voxel-based data structure may be organized into a plurality of different voxels corresponding to the different locations of the simulated 3D environment (e.g., the various cubes of the 3D grid described above), and, since the light dataset and the audio dataset are both associated with the same particular location within the simulated 3D environment, both of these datasets may be stored within a same particular voxel that corresponds to that particular location within the simulated 3D environment. Moreover, since the light dataset and the audio dataset each describe concurrent frame times during a period of time the simulated 3D environment is being simulated, a timestamp or the like that indicates this frame time and/or correlates the datasets together in time may also be stored in the voxel, along with other suitable data for the simulated 3D environment that may be associated with that location.

An audiovisual content rendering system such as system 100 may use light and audio datasets generated and stored in accordance with method 200 in any suitable way to accomplish a unified rendering of light and sound content for the simulated 3D environment. As one example, after generating and storing the datasets in the ways described above, system 100 may access, from the particular voxel of the voxel-based data structure, the light dataset and the audio dataset, and may render (e.g., based on the accessing of the light dataset and the audio dataset) audiovisual content (e.g., extended reality content) for presentation to a user by way of an audiovisual presentation device. For instance, the user may be associated with an avatar positioned at the particular location within the simulated 3D environment and the extended reality content may therefore provide an immersive audiovisual experience for the user in which not only the light being presented is customized to the avatar's exact location (e.g., in terms of shading, brightness, etc.) but the sound being presented is customized for the avatar's location as well (e.g., in terms of volume, reverberation, interaural spatial cues, and/or other audio effects described herein). Since, as mentioned above, light and audio datasets for other locations besides the particular location may also be generated and stored over a period of time in which the 3D environment is being simulated, additional data may be similarly accessed, rendered, and presented by system 100 as the user moves his or her avatar within the simulated 3D environment. In this way, the user (as well as other users who may be sharing in the extended reality experience based on the same extended reality content) may enjoy both light and sound that is continuously customized to the avatar's location.

Extended reality content rendered in this way may be presented or otherwise used in any suitable application or use case (e.g., in a game or other extended reality application, in a communication application, etc.). It will be understood that additional operations besides those explicitly shown in FIG. 2 and/or described above may also be performed as part of method 200 to efficiently create various other high-quality user experiences described herein and/or as may serve a particular implementation.

Figure 3:
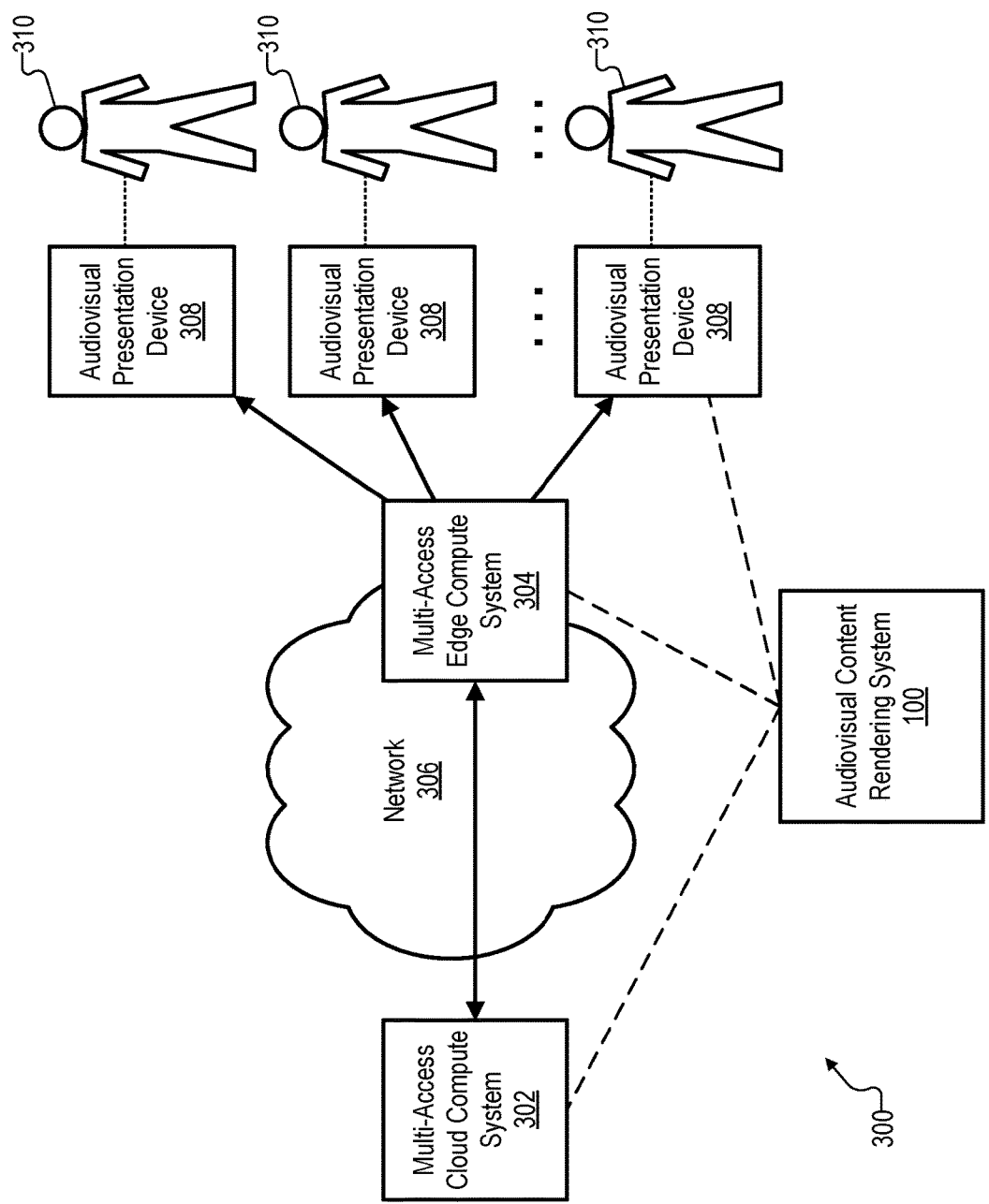
FIG. 3 shows an illustrative configuration within which an audiovisual content rendering system may be deployed.

FIG. 3 shows an illustrative configuration 300 within which one or more implementations of system 100 may be deployed. For example, as illustrated with dashed lines in configuration 300, system 100 may be implemented by a multi-access cloud compute system 302, by a multi-access edge compute (MEC) system 304 implemented on an edge of a network 306 (e.g., a provider network), by an audiovisual presentation device 308 operated by a user 310 (e.g., an end user), or by a combination of one or more of these devices and/or other suitable devices (not explicitly shown in FIG. 3). As shown in FIG. 3, network 306 may provide a communicative fabric by way of which various computing systems and devices (e.g., including whichever devices implement part or all of system 100) may intercommunicate and interoperate with one another. For example, multi-access cloud compute system 302 is shown in this example to be in communication, by way of network 306, with MEC system 304, which, operating at the edge of network 306, is configured to communicate with a plurality of different audiovisual presentation devices 308.

Multi-access cloud compute system 302 may represent any cloud computing system accessible to audiovisual presentation devices 308 by way of network 306. Such cloud computing systems may be configured to provide computing services to a plurality of client devices (e.g., audiovisual presentation devices 308) using powerful, consolidated computing resources (e.g., in a cloud data center).

MEC system 304 may represent similar types of computing resources accessible to client devices such as audiovisual presentation devices 308, but, rather than being operated remotely and accessed by way of network 306, may be integrated as part of network 306 (e.g., by a provider network included within network 306). For instance, MEC system 304 may be provided and maintained by a data services provider such as a wireless carrier managing a provider network incorporated within network 306.

Network 306 may be implemented by any suitable private or public networks as may serve a particular implementation. For instance, part of network 306 may be implemented by a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). The provider of such a provider network may own or control all of the elements necessary to sell and deliver communications services between multi-access cloud compute system 302, MEC system 304, any or all of audiovisual presentation devices 308, and/or other computing devices (e.g., including devices not explicitly shown in FIG. 3) that may be connected to network 306. Such communications services may include radio spectrum allocation, wireless network infrastructure, provisioning of devices, network repair, and so forth. In some examples, other networks not controlled by the provider may also be included within network 306. For example, external network infrastructure may include the Internet, one or more wide area networks or local area networks to which audiovisual presentation devices 308 are connected, a content delivery network, and/or any other suitable network or networks managed by any third parties outside of the control of the provider of the provider system described above. The network elements associated with network 306 may implement or employ any suitable communication technologies, devices, media, protocols, or the like as may serve a particular implementation.

Audiovisual presentation devices 308 may present both graphics (e.g., visual representations of a simulated 3D environment) and sound (e.g., audio representations of the simulated 3D environment) from arbitrary locations selected by a respective user 310 within a simulated 3D environment. To this end, audiovisual presentation devices 308 may be implemented by various types of devices that are capable of displaying graphics and sound to users. For instance, a particular audiovisual presentation device 308 could be implemented as (or included within) a computing system such as a mobile device (e.g., a smartphone, a tablet computing device, etc.), a dedicated virtual reality or augmented reality presentation device (e.g., a head-mounted device configured to display graphics directly in front of each eye of a user 310), a portable or stationary computing device (e.g., a personal desktop or laptop computer, etc.), a television device, or any other system or device as may serve a particular implementation. To display rendered visual content, an audiovisual presentation device 308 may include one or more display screens (e.g., traditional display screens, partially transparent heads-up display (HUD) screens, light projectors, computer monitors, etc.) configured to display frames rendered by the device itself or by server-side systems such as multi-access cloud compute system 302 or MEC system 304. To present rendered audio content, the audiovisual presentation device 308 may include or be coupled with one or more loudspeakers such as earphones worn by the user 310, a multi-speaker surround sound system, or the like.

Each user 310 may represent any person who experiences audiovisual content presented by a respective audiovisual presentation device 308, and will be understood to typically have at least some degree of control over what audiovisual content the device presents. For example, if an audiovisual presentation device 308 is implemented as an augmented or virtual reality presentation device, a user 310 may move the device with respect to a virtual scene being presented and may, in this way, control the location within the simulated 3D environment from which the virtual or augmented reality experience is provided.

Figure 4:
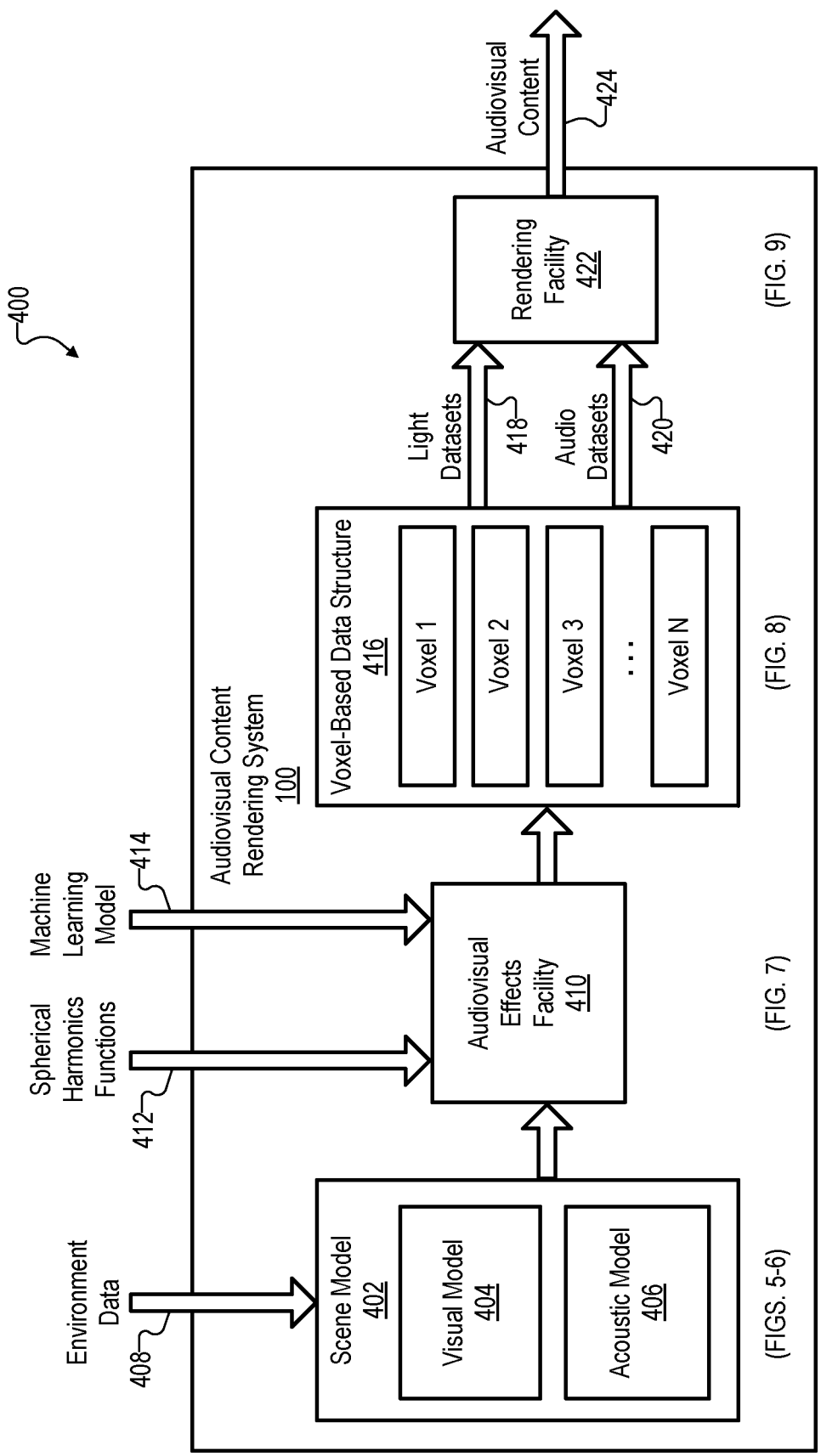
FIG. 4 shows illustrative data and data processing facilities used by an example implementation of an audiovisual content rendering system.

FIG. 4 shows illustrative data and data processing facilities used by an example implementation 400 of audiovisual content rendering system 100. As shown, implementation 400 includes various illustrative data and facilities that are configured, collectively, to perform unified rendering of light and sound content for a simulated 3D environment (e.g., to perform the operations of method 200 and/or other operations described herein). The facilities of implementation 400 of system 100 will be understood to be implemented by computer hardware and software resources in any suitable way. For instance, each facility may represent software executing on a shared processor (e.g., an implementation of processor 104 that executes software associated with all of the facilities) to perform the operations described to be performed by that facility. As another example, each facility may be performed by a separate processor or even a separate computing system (e.g., a separate server, container, etc., in a multi-access computing environment). Collectively, the facilities of implementation 400 form a pipeline in which data is input, processed, stored, accessed, and used to generate output data (audiovisual content in this example) that can be directly consumed by a user or provided to another system for presentation to a user.

As shown, a scene model 402 includes data representing certain aspects of a simulated 3D environment. In this example, scene model 402 is shown to include a visual model 404 for the simulated 3D environment and an acoustic model 406 for the simulated 3D environment. Environment data 408 represented by an input arrow is shown to be received and incorporated by scene model 402 to generate and maintain the visual and acoustic aspects of scene model 402 in ways described herein. For example, environment data 408 may describe the simulated 3D environment itself (e.g., the geometry of the environment, ambient sound within the environment, visual aspects of one or more boundaries such as the ground or walls defining the environment, etc.), as well as one or more objects (e.g., inanimate objects) or subjects (e.g., human avatars, non-player characters, animals, etc.) included within the environment. As parenthetically indicated in FIG. 4, additional detail regarding the simulated 3D environment represented by scene model 402 and environment data 408 will be further described and illustrated below with reference to FIGS. 5 and 6.

An audiovisual effects facility 410 within implementation 400 of system 100 is shown to receive and process data representative of scene model 402 using computation strategies or algorithms defined, for example, by a set of spherical harmonics functions 412 and/or a machine learning model 414. As will be described in more detail with reference to FIG. 7 (as parenthetically indicated below audiovisual effects facility 410 in FIG. 4), audiovisual effects facility 410 may generate light datasets and audio datasets such as those described above in relation to operations 202 and 204, and may store this data in a voxel-based data structure 416 that is arranged to include a plurality of voxels (e.g., voxels 1-N, as shown in this example). As parenthetically indicated below voxel-based data structure 416 in FIG. 4, FIG. 8 will be referred to below to describe voxel-based data structure 416 in more detail.

One or more light datasets 418 and/or audio datasets 420 may be efficiently accessed from voxel-based data structure 416 by a rendering facility 422 that uses these datasets to render audiovisual content 424, which may be presented to a user in any of the configurations described herein. As parenthetically indicated below rendering facility 422, certain aspects of how audiovisual content 424 may be generated and provided based on light datasets 418 and audio datasets 420 will be described below with reference to FIG. 9.

It will be understood that the entire audiovisual content rendering pipeline illustrated in FIG. 4 may be performed by any suitable computing resources as may serve a particular implementation. In some examples, some or all of the facilities of implementation 400 may be assisted with GPU acceleration for fast processing or other such enhancements. Each of the facilities and the datasets produced thereby will now be described in more detail with reference to the figures parenthetically indicated in FIG. 4.

Scene model 402 may describe visual aspects (visual model 404) and audio aspects (acoustic model 406) of a simulated 3D environment, and may be generated and maintained based on environment data 408 that describes the environment and the objects and subjects included therein (e.g., in real time and/or as the objects and subjects change). For example, to maintain scene model 402 and ultimately generate light datasets 418 and audio datasets 420, system 100 may access an environment dataset (e.g., environment data 408) that includes data defining characteristics of the simulated 3D environment and a set of simulated object surfaces included in the simulated 3D environment. The generating of the light dataset and the audio dataset may then be performed based on this environment dataset as will be made apparent below.

Figure 5:
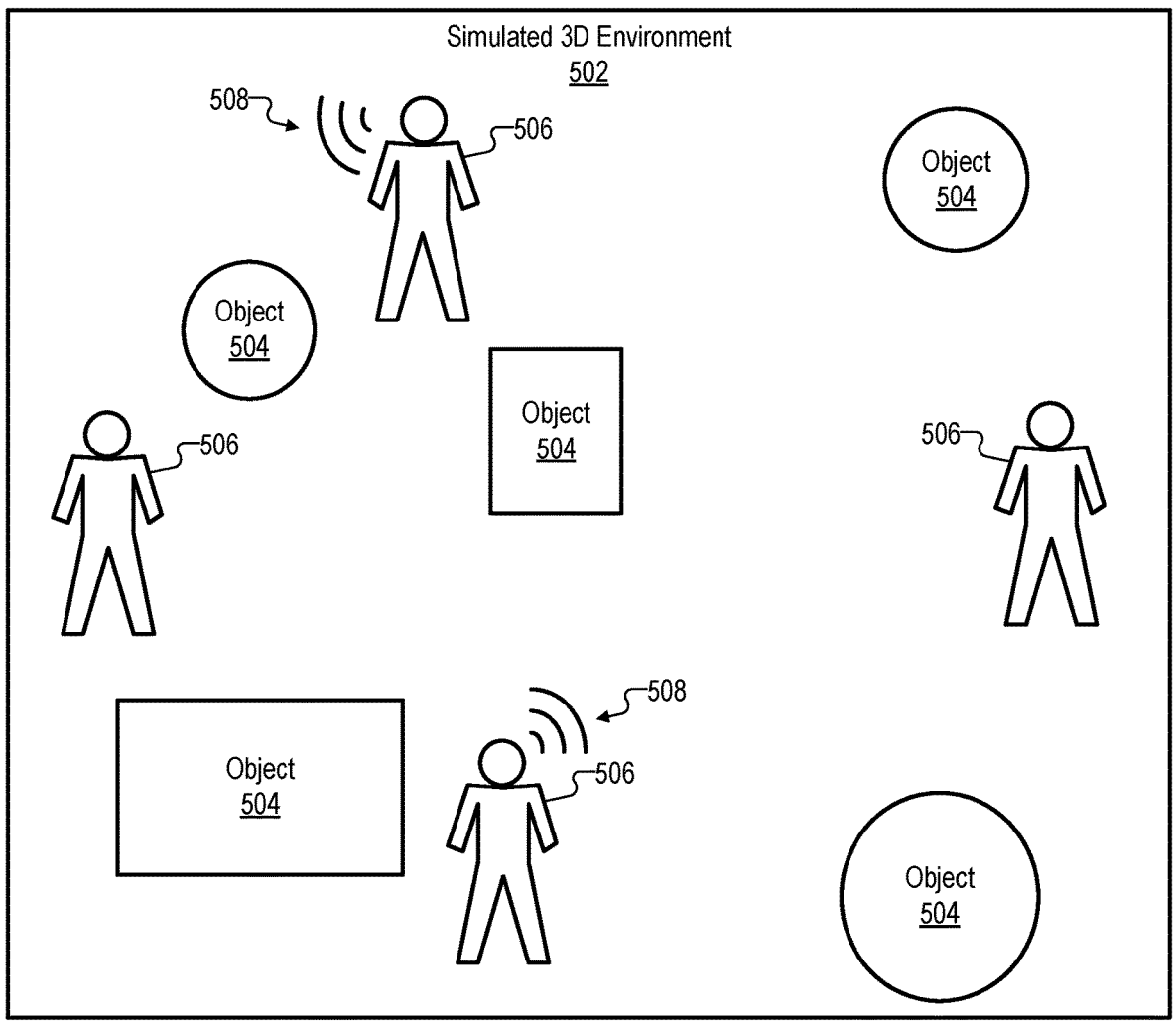
FIG. 5 shows an illustrative simulated 3D environment including objects and avatars that are rendered by an implementation of an audiovisual content rendering system.

To illustrate how a same input dataset of environment data 408 may be used to define characteristics of a simulated 3D environment and simulated object surfaces included therein, FIG. 5 shows an example of a simulated 3D environment 502 that includes various objects 504 (represented by different types and sizes of geometric shapes) and avatars 506 at various locations within the environment. Scene model 402 may include data indicating where these objects and avatars are located within simulated 3D environment 502. Additionally, within visual model 404 in particular, scene model 402 may represent how the objects and avatars appear and/or what virtual materials they are constructed from. Within acoustic model 406 in particular, scene model 402 may also represent various sounds 508 that originate at objects 504 and/or avatars 506 (e.g., speech originating from avatars 506 or other suitable sounds originating from objects 504 and/or avatars 506). As will be described in more detail below, audiovisual aspects of simulated 3D environment 502 (and objects 504 and avatars 506 within the environment) may be rendered for presentation to one or more users by implementation 400 of system 100. As such, it will be understood that simulated 3D environment 502, objects 504, and especially avatars 506 may be, to at least some extent, under the control of these one or more users (not explicitly shown in FIG. 5). Hence, as objects 504 and/or avatars 506 dynamically move and change within simulated 3D environment 502 (e.g., under control of users associated with the avatars), environment data 408 may indicate these dynamic changes so that scene model 402 (and visual model 404 and acoustic model 406 within it) may be kept up to date as an accurate representation of events occurring within simulated 3D environment 502. As used herein, a "user" may be referred to as being present at or moving to a particular location within a simulated 3D environment. This type of statement will be understood as a concise verbal shorthand for referring to the user's control of his or her avatar to cause the avatar to be present at or to move to the particular location.

While simulated 3D environment 502 is shown as having a square shape, it will be understood that simulated 3D environment 502 may be defined with boundaries giving it any suitable shape. For example, simulated 3D environment 502 may represent a room or a set of rooms in a building that have any shape as may serve a particular implementation. In some examples, simulated 3D environment 502 may represent an outdoor area rather than an indoor room, and may be defined by boundaries such as tall structures (in an outdoor city scene) or even boundaries that are invisible (in an open outdoor scene) so that users can see past the boundaries even if they are not able to move their avatars outside of the boundaries. For clarity of illustration on a 2D page, simulated 3D environment 502 is drawn in FIG. 5 as a flat (2D) surface with flat (2D) objects and avatars. It will be understood, however, that objects 504 and avatars 506 may actually be three dimensional and located at 3D locations within simulated 3D environment 502.

As has been mentioned, partitioning a simulated 3D environment into voxels and representing the environment in a location-centric manner using a voxel-based data structure may be an effective way to manage and track light and acoustic energy that is propagating through the environment. As used herein, a "voxel" may refer to a particular volume within a 3D space (e.g., analogous to how a pixel refers to a particular area within a 2D space). Additionally, as used in slightly different contexts herein, a "voxel" may refer to a discrete data structure (e.g., within a voxel-based data structure that includes a plurality of such voxels) within which data may be stored and/or with which data may otherwise be linked or associated. For instance, a voxel data structure may be used to store various types of data associated with a voxel volume of a 3D space, including, for example, coordinate data or other location data for the volume of space, size data defining the size of the volume covered by the voxel, color or texture data associated with a surface in that volume of space, energy data (e.g., audio or light data, etc.) associated with that volume of space, or the like. The concept of a voxel as a unit of data storage will be described in more detail below with reference to voxel-based data structure 416. But it will be understood that the concept of a voxel defining a volume of 3D space applies to the space of simulated 3D environment 502 shown in FIG. 5.

Figure 6:
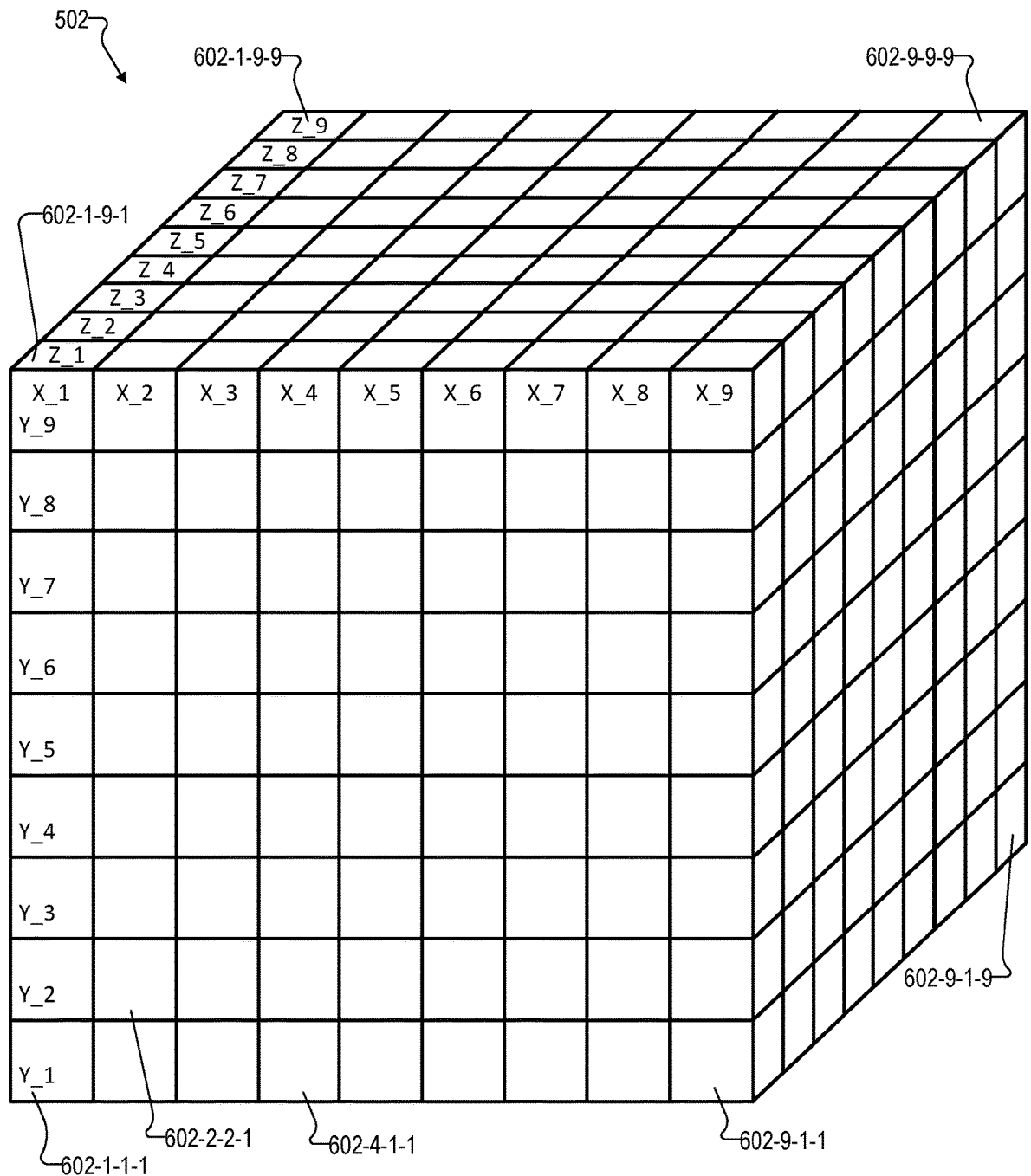
FIG. 6 shows illustrative voxels associated with a simulated 3D environment rendered by an audiovisual content rendering system.

To illustrate, FIG. 6 shows illustrative voxels 602 laid out in a three-dimensional grid pattern across simulated 3D environment 502. As shown by a few specific examples that are called out with reference numbers, voxels 602 may be laid out with respect to an XYZ cartesian coordinate system in which an origin is at the front-bottom-left corner of simulated 3D environment 502 (i.e., at voxel 602-1-1-1), X coordinates increase from left to right (i.e., "X_1" through "X_9" in this example), Y coordinates increase from bottom to top (i.e., "Y_1" through "Y_9" in this example), and Z coordinates increase from front to back (i.e., "Z_1" through "Z_9" in this example). Reference numbers of each labeled voxel 602 are shown to indicate a position of that voxel according to this coordinate system. For example, voxels 602-1-1-1, 602-4-1-1, and 602-9-1-1 are spread along the X-axis (at the first column ('1'), fourth column ('4'), and ninth column ('9'), respectively) while being on the first row ('1') of the Y-axis and the front-most plane ('1') of the Z-axis. A few other voxels (e.g., voxels 602-2-2-1, 602-9-1-9, 602-1-9-1, 602-1-9-9, and 602-9-9-9) are similarly labeled at other positions in the simulated 3D environment according to this same convention.

By dividing the environment into these various locations and using a voxel-based geometry and data structure, system 100 may efficiently store both light datasets and audio datasets (as well as other types of data outside the scope of this disclosure) in an organized and computationally efficient manner that associates specific locations within simulated 3D environment 502 with how and where data associated with those locations are stored. For example, any voxel 602 in this space may be used to store unique audio data (e.g., pitches and amplitudes) of the volume of space represented by that voxel 602, as well as unique light data (e.g., chrominance and luminance) of that volume of space. Accordingly, sound and light effects may be rendered in a locationally-dependent way such that the sound and light effects presented to a user may be customized to the exact location of the user's avatar within the simulated 3D environment. This may be continuously repeated throughout the course of a 3D simulation so that audio heard by users change as they move their avatar over time.

As was shown in FIG. 5, various sound sources (e.g., objects 504 and/or avatars 506) producing different sounds 508 may be located at different positions within simulated 3D environment 502. It will be understood that objects 504 and avatars 506 may not only produce sounds 508, but may also influence the virtual propagation of sounds in accordance with established physical laws and mathematical relationships. Accordingly, in a 3D simulation, sound sources deployed in the scene may emit sounds 508 and virtual sound waves may be modeled similar to light rays such that light data (e.g., chrominance and luminance) may be repurposed for audio data (e.g., pitch and amplitude). Acoustical physics (e.g., attenuation, reverberation, distortion, etc.) may be applied to the emanating sound waves as the sound waves traverse simulated 3D environment 502 and voxels 602 that cover it, and audio data values of the sound waves may be stored within a voxel-based data structure according to the voxels the sound waves cross. For example, audio data stored in each voxel may define pitch and amplitude over a period of time (e.g., a ⅓₀th second sound clip for 30 fps) for that specific voxel 602 (e.g., unique to the position of the voxel within the environment).

Returning to FIG. 4, the scene model 402 generated and maintained based on environment data 408 to define and track simulated 3D environment 502 and the objects and avatars included therein may be used by audiovisual effects facility 410 to compute how light and sound propagate through the environment (e.g., from voxel 602 to voxel 602). Audiovisual effects facility 410 may generate audio and light datasets that are locationally stored within voxel-based data structure 416 as mentioned above and as will be described and illustrated in more detail below. For example, an audio dataset for a particular location may be generated based on a simulated propagation of sound waves (e.g., within the simulated 3D environment and by way of simulated object surfaces) from a sound source to the particular location, and the simulated propagation of the sound waves may simulate physical interactions of the sound waves with the simulated object surfaces. These physical interactions may include, for example, an attenuation of the sound waves, reverberation of the sound waves, distortion of the sound waves, and/or any other suitable physical interactions that may be detected to occur in the real world and are simulated for the virtual environment. Just as this audio dataset may be generated for this particular location, it will be understood (as mentioned above) that additional audio datasets associated with the simulated propagation of the sound waves may also be stored within additional voxels of the voxel-based data structure (e.g., as the sound waves are simulated to cross different voxels en route from the sound source to a listener). Light data may also be processed in similar ways as has been described for the sound waves.

As shown, audiovisual effects facility 410 may generate light and audio datasets based on input from scene model 402 in connection with certain physical and computational models that have been developed for accurately representing and modeling physical processes (e.g., physical interactions of light and/or acoustic energy with object surfaces, etc.). As one example illustrated by spherical harmonics functions 412, each light dataset generated by audiovisual effects facility 410 may be configured to model light energy by applying a set of spherical harmonics functions to simulate propagating light waves interacting with simulated object surfaces in simulated 3D environment 502, while each audio dataset generated by audiovisual effects facility 410 may be configured to model the acoustic energy by applying the set of spherical harmonics functions to simulate propagating sound waves interacting with the simulated object surfaces in the simulated 3D environment. As mentioned above, the same generalized set of spherical harmonics functions may be user to simulate both light and acoustic energy due to the similar ways in which these different types of energy interact with different types of object surfaces in the world. Accordingly, while some conversion of specific equations and variables may be performed to handle, for instance, chrominance and luminance characteristics of light and frequency and intensity characteristics of sound, the same general spherical harmonics principles may be applied by audiovisual effects facility 410 to process the interactions of both of these types of energy with object surfaces in the environment.

Figure 7:
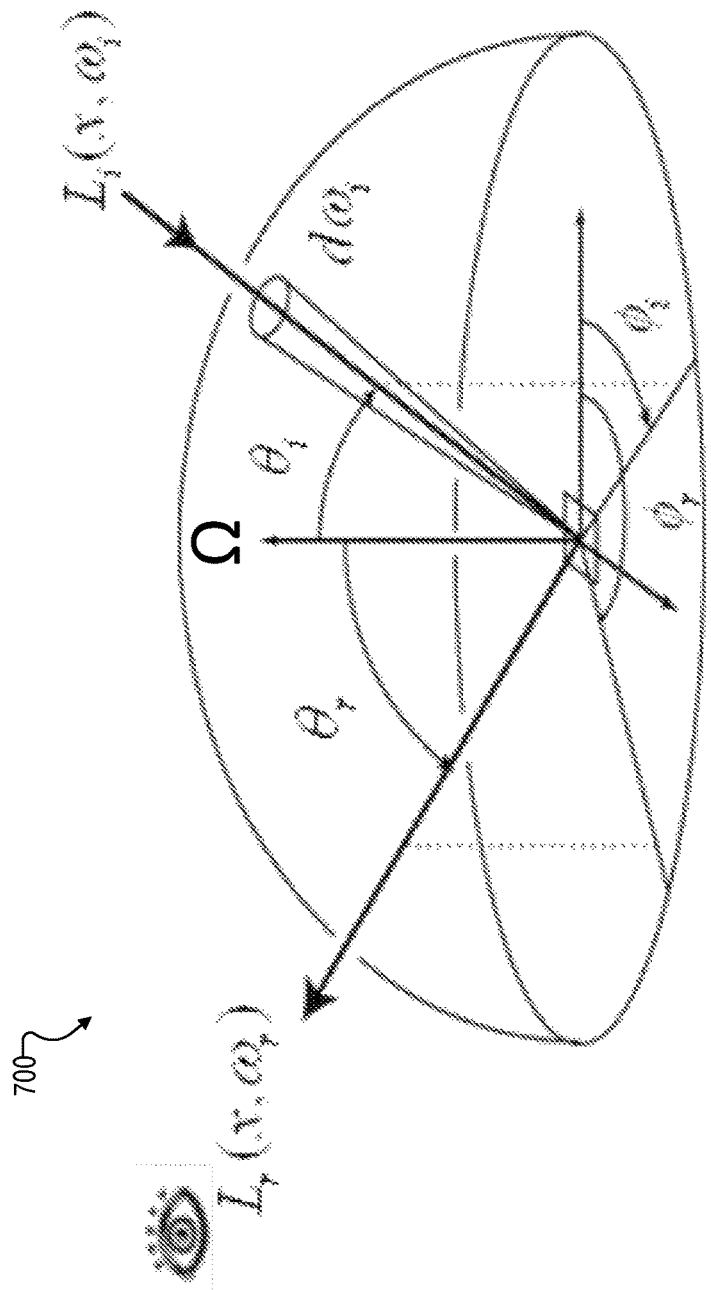
FIG. 7 shows illustrative aspects of how light and sound may be simulated to interact with an example surface point within a simulated 3D environment.

To illustrate, FIG. 7 shows example aspects of how light and sound may both be simulated to interact with an example surface point 702 within a simulated 3D environment. As shown in FIG. 7, a diagram 704 is accompanied by a rendering equation 706 that defines a mathematical relationship between energy that reaches a user from the particular surface point 702 (e.g., light energy that reaches the eye, acoustic energy that reaches the ear, etc.) and the energy that is either sourced (e.g., radiated) by that surface point 702 or reflected from that surface point 702. While rendering equation 706 of FIG. 7 has generally been used to generate accurate lighting effects by simulating how light interacts with a given surface point, the same concepts may also by applied by audiovisual effects facility 410 to acoustic energy to determine accurate acoustic effects on a voxel-by-voxel basis. For example, just as light radiance may be integrated using spherical coordinates (as illustrated by FIG. 7), acoustic analogues to light radiance may be determined using the same equations or algorithms since sound may react to objects surfaces in analogous ways as light (e.g., reflecting to certain degrees from certain surfaces, becoming attenuated to certain degrees from certain surfaces, etc.). Just as light energy interacts with different surfaces in different ways (e.g., frequency (color) attenuation, amplitude (brightness) attenuation, etc.), so too does acoustic energy interact with these surfaces (e.g., frequency (pitch) attenuation, amplitude (loudness) attenuation, etc.).

Returning to FIG. 4, along with using spherical harmonics functions 412 to determine light and/or audio datasets, audiovisual effects facility 410 is shown to input a machine learning model 414 that may further assist audiovisual effects facility 410 in making these computations. Machine learning may be employed to develop further computing efficiencies by training a neural network on the correlation of light and sound rendered across different virtual object surfaces and surface characteristics that affect modeled wave energy in the virtual environment. By training a machine learning system, direct correlations between object surfaces, lighting effects that occur on the object surfaces, and sound effects that result from the interaction of sound waves with the object surfaces may be established, which may further reduce computational time and resources. For example, machine learning model 414 may allow sound data to be determined and/or predicted based on light data for a particular surface point, or may allow light data to be determined and/or predicted based on audio data for the particular surface point. Efficiencies gained in this way may help to reduce the overall computing resource usage and may enable more complex and faster processing of the simulated 3D environment.

In certain implementations that employ such machine learning technology, system 100 may maintain machine learning model 414, which may be trained based on light data and audio data stored within voxel-based data structure 416. Then either or both of the following may occur as audiovisual effects facility 410 generates light and audio datasets based on scene model 402 using spherical harmonics functions 412: 1) the generating of the light dataset may be performed based on the audio dataset and machine learning model 414, and/or 2) the generating of the audio dataset may be performed based on the light dataset and machine learning model 414.

To implement machine learning model 414, a neural network may be constructed and operated as follows. First, each voxel may store parameters including an input parameter (e.g., sound wave and light wave) and an output parameter (e.g., yes or no, for inferencing location of light or sounds). For inference, a function F may be yes or no, where F is a function of g(sound_inputs) and q(light_input), or vice versa. Next, together with spatial information for each voxel, the input layer and output layer may create a training loop for a neural network. For training, the inverse of the inference function is taken and visual, graphics, and light information may be treated as ground truth to train the neural network through back propagation.

Light and audio datasets generated by audiovisual effects facility 410 may be stored in voxel-based data structure 416 in a location-centric manner as has been described. For example, after modeling and computing the audiovisual effects using spherical coordinates (as shown in FIG. 7), system 100 may essentially "collapse" the computed light and acoustic energy into a particular location associated with the most relevant (e.g., most proximate) one of the voxels 602 (shown in FIG. 6). To accomplish this, spherical coordinates of each surface point may be converted to cartesian coordinates and the computed datasets may be stored at voxels associated with those coordinates (e.g., voxel 602-1-1-1 for a surface point in the front-bottom-left corner of simulated 3D environment 502, etc.).

To illustrate how voxel-based data structure 416 may be arranged so as to produce the efficiencies and other benefits that have been described, FIG. 8 shows several illustrative views of voxel-based data structure 416. Specifically, a view 800-1 shows how voxels may be geometrically organized with respect to different locations in a given space, a view 800-2 shows how a linked tree structure parallel to the geometric structure shown in view 800-1 may be conceptually and functionally arranged, and a view 800-3 shows a data storage view of the voxel-based data structure. In all of these examples, voxel-based data structure 416 is illustrated in 2D (rather than 3D) for illustrative and explanatory convenience. For example, rather than showing a 3D cube structure (similar to that shown in FIG. 6), view 800-1 shows a 2D square structure; rather than showing an octree structure in which each node is parent to eight (i.e., $2^3$) child nodes, view 800-2 shows a quadtree structure in which each node is parent to four (i.e., $2^2$) child nodes; and rather than illustrating divisions of eight different segments in voxel-based data structure 416, view 800-3 shows divisions of four different segments that correspond to the 2D divisions illustrated in the other views. It will be understood, however, that the principles described and illustrated in relation to FIG. 8 may be applied to three dimensions instead of the two dimensions represented in FIG. 8. Specifically, eight cubes/nodes/divisions may replace the four cubes/nodes/divisions per layer shown in FIG. 8. It will also be understood that the structures illustrated in FIG. 8 are provided by way of illustration as one efficient and optimized way that a voxel-based data structure may be implemented (e.g., to allow for data storage to be efficiently accessed based on location rather than linearly), but that voxel-based data structure 416 may, in certain embodiments, be implemented in other suitable ways.

In view 800-1, a 2D space is shown to be recursively divided into quadrants (i.e., squares) in recursive layers 802, 804, and 806. It will be understood that additional recursions may be implemented as needed, based on the size of the space and based on the resolution that is desired for the voxels. As shown, in this example, a first layer 802 is shown to include four quadrants 802-1 through 802-4, a second layer 804-2 (since, in this example, the layer is arbitrarily shown to be included within quadrant 802-2) is shown to include four quadrants 804-2-1 through 804-2-4, and a third layer 806-2-3 (since, in this example, the layer is arbitrarily shown to be included within quadrant 804-2-3) is shown to include four quadrants 806-2-3-1 through 806-2-3-4 (only one of which is labeled in view 800-1 as "806" due to space constraints). Since this is a leaf node (i.e., the lowest level of the recursion) in this example, a particular quadrant 806-2-3-4 (the quadrant labeled "806") is shown to be shaded and will be referred to as voxel 806-2-3-4.

In view 800-2, the linked tree representation shows a plurality of nodes including a root node (labeled as "416") that encompasses all of voxel-based data structure 416, four child nodes of the root node on a layer 802 (corresponding to quadrants 802-1 through 802-4 in view 800-1), four child nodes of node 802-2 on a layer 804-2 (corresponding to quadrants 804-2-1 through 804-2-4), and four child nodes of node 804-2-3 on a layer 806-2-3 (corresponding to quadrants 806-2-3-1 through 806-2-3-4). As in view 800-1, voxel 806-2-3-4 is shown to be shaded in view 800-2, and it will be understood that this linked node in the tree corresponds to the shaded area in the geometric space of view 800-1.

In view 800-3, the data structure representation shows a data repository partitioned into four divisions corresponding to quadrants 802-1 through 802-4. Similarly as described above in relation to views 800-1 and 800-2, quadrant 802-2 is shown to be subdivided into four quadrants 804-2-1 through 804-2-4, and quadrant 804-2-3 is shown to be further subdivided into four quadrants 806-2-3-1 through 806-2-3-4 (not explicitly labeled in FIG. 8 due to space constraints). A shaded quadrant 806 corresponding to the other shaded portions of views 800-1 and 800-2 is broken out in view 800-3 to show that an audio dataset 808 and a light dataset 810 may be stored within this voxel 806-2-3-4. For example, audio dataset 808 and light dataset 810 will be understood to correspond to the shaded area of the geometric space illustrated in view 800-1 and to be efficiently accessed by way of just three layers in the linked tree structure shown in view 800-2. While FIG. 8 focuses on this single voxel 806-2-3-4 and its corresponding audio dataset 808 and light dataset 810, it will be understood that a plurality of light datasets 418 and audio datasets 420 may be stored within different voxels 806 of a 3D implementation of voxel-based data structure 416 in accordance with the principles illustrated in FIG. 8.

Audio dataset 808 and light dataset 810 may include any suitable sound data and/or light data for voxel 806-2-3-4, including any of the types of sound data and/or light data described herein. For example, audio dataset 808 may represent pitch and amplitude characteristics for a particular audio frame time at the particular location associated with voxel 806-2-3-4, while light dataset 810 may represent chrominance and luminance characteristics for a video frame time (e.g., a video frame time concurrent with the audio frame time) at the particular location. Due to the nature of how video and sound data are stored and presented, a frame of video may comprise a static image that lasts for one frame length (e.g., one video frame time), while a frame of audio may comprise a dynamic (albeit short) sound clip that lasts for one frame length (e.g., one audio frame time, which may be the same or different than a video frame time). Accordingly, the pitch and amplitude characteristics represented by audio dataset 808 may be configured for continuous rendering throughout the audio frame time and the chrominance and luminance characteristics represented by light dataset 810 may be configured for static rendering at the video frame time. This may be true, for each frame time, of each respective audio dataset and light dataset stored in each voxel 806 within voxel-based data structure 416.

Returning to FIG. 4, light datasets 418 may comprise a plurality of light datasets stored in a plurality of voxels represented within voxel-based data structure 416 (e.g., including light dataset 810 of voxel 806-2-3-4 and analogous light datasets from other voxels 806 that are in use). Similarly, audio datasets 420 may comprise a plurality of audio datasets stored in the plurality of voxels within voxel-based data structure 416 (e.g., including audio dataset 808 of voxel 806-2-3-4 and analogous audio datasets from other voxels 806 that are in use). These datasets may be accessed from voxel-based data structure 416 by rendering facility 422 with any suitable timing and in any suitable way as rendering facility 422 uses light datasets 418 and audio datasets 420 to generate audiovisual content 424.

Audiovisual content 424 may be implemented as rendered video content comprising a discrete sequence of rendered images to be presented as video frames and a continuous sequence of rendered audio content (e.g., made up of a set of short audio clips strung together) to be presented as one or more audio tracks (e.g., stereo audio tracks, spatial audio tracks, surround sound audio tracks, etc.) that accompany the video content. In some examples, audiovisual content 424 may be customized to one particular user, to whom the audiovisual content is transmitted and/or presented. For instance, audiovisual content 424 may be a video stream that continuously shows video and plays audio specific to whatever location within simulated 3D environment 502 the particular user chooses to occupy with his or her avatar. In other examples, audiovisual content 424 may include audiovisual content that incorporates multiple viewpoints, such that different users occupying different locations within simulated 3D environment 502 may each be presented different parts of the same audiovisual content 424 stream to provide the different users with different experiences.

Regardless of how audiovisual content 424 is formatted, an audiovisual presentation device such as any of audiovisual presentation devices 308 may be configured to present, to a user of the device, audio clips and video frames that are both based on the user's specific location in the simulated 3D environment (i.e., the location the user chooses for his or her avatar). Then just as lighting effects are made to change based on the movement of the user through the environment, the listening perspective of the sound presented to the user may be made to change based on virtual location as well. For example, as long as the user remains in a fixed location, the presentation device presents a sequence of frame-length (e.g., $\frac{1}{30}^{th}$ second, etc.) audio clips for that fixed location. Then, when the user moves to a new location, the presentation device presents frame-length audio clips consistent with the user's new location, even as that location is dynamically changing and moving through the environment. In this way, the audiovisual presentation device may jump from audio clip to audio clip as the user moves his or her avatar from location to location (and therefore voxel to voxel) within the simulated 3D environment. The sound presented to the user is therefore continually drawn from the most relevant voxel for the current location and users therefore always hear sounds specific to the locations they choose, including when different users occupy different locations in the same simulated 3D environment at the same time.

Figure 9:
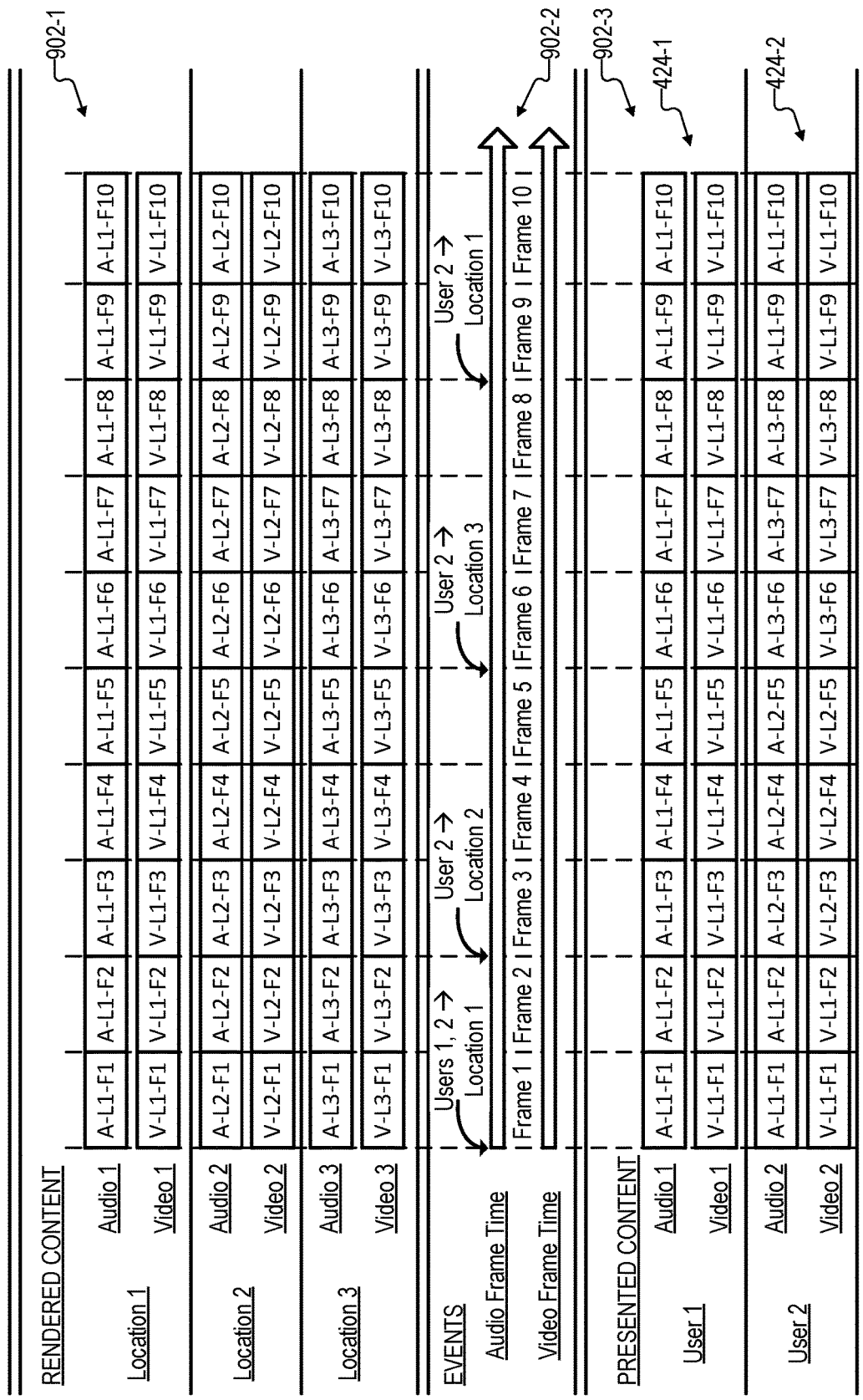
FIG. 9 shows illustrative audiovisual content frames that may be presented to different users as the users move through a simulated 3D environment in time.

To illustrate how audiovisual content 424 for different users who may be moving or remaining static within a simulated 3D environment may be generated, FIG. 9 will now be described. As shown, FIG. 9 depicts illustrative audiovisual content frames that may be presented to different users as the users move through a simulated 3D environment during a period of time. More particularly, FIG. 9 is divided into three sections 902: First, a section 902-1 shows a few examples of rendered content for different locations ("Location 1" through "Location 3") within a simulated 3D environment. Second, a section 902-2 shows a timeline along which different frames (e.g., audio frames and video frames) are illustrated and along which certain events (e.g., user movements, etc.) are indicated to occur coincident with those frames. Third, a section 902-3 shows two instances of audiovisual content 424 (labeled audiovisual content 424-1 and audiovisual content 424-2) that are presented to different users (e.g., "User 1" and "User 2") who are experiencing the simulated 3D environment during the same time period.

In each section 902, ten frame times are shown to correspond to ten distinct audio/video frames explicitly labeled in section 902-2 ("Frame 1", "Frame 2", etc.). Whether content is stored and presented in real time (e.g., as events occur in a real-world scene upon which the simulated 3D environment is based) or divorced from any concept of real-world time (e.g., such as for a preexisting virtual simulation not based on any real-world scene), it will be understood that audio and video frames (depicted as small, labeled boxes in sections 902-1 and 902-3) are time-aligned with respect to a single time line. As such, for example, a first column of FIG. 9 (including "Frame 1" in section 902-2 and a variety of audio and video frames ending with a suffix "F1") will be understood to include audiovisual content rendered for this frame time (e.g., for different locations as shown in section 902-1) as well as audiovisual content selected for presentation for this frame time (e.g., for different users as shown in section 902-3). Similarly, a second column of FIG. 9 (including "Frame 2" in section 902-2 and a variety of audio and video datasets ending with a suffix "F2") will be understood to include audiovisual content rendered and presented for this subsequent frame time (after the first frame time), and so forth for the remainder of the columns of FIG. 9.

The notation used to indicate the contents of each of the audio and video frames in FIG. 9 is a three-part notation: First, an 'A' or a 'V' prefix in the label for each frame indicates whether the frame includes audio ('A') content (e.g., a short audio clip lasting for one frame length) or video ('V') content (e.g., a static image that is to be displayed for one frame length). Second, an 'L1', 'L2', or 'L3' indicator in the label for each frame indicates which location (of the three Locations 1 (L1), 2 (L2), or 3 (L3) in this example) the frame represents. Finally, as mentioned above, a suffix "F1"-"F10" in the label for each frame indicates which of the ten frame times the frame corresponds to. The content rendered and presented within the audio and video frames may be generated by rendering facility 422 based on light datasets 418, audio datasets 420, and any other information as may be available to rendering facility 422 (e.g., scene model 402, environment data 408, other data not explicitly shown in FIG. 4, etc.). In some cases, rendered/presented content in these frames may be identical to or closely related to datasets stored in voxel-based data structure 416. For example, each of the audio frames may correspond to one of audio datasets 420 accessed from voxel-based data structure 416. In other cases, rendered/presented content in these frames may be generated based on datasets stored in voxel-based data structure 416, but the resultant content may be significantly transformed from the content stored in the voxels. For example, each of the video frames may be generated using one of light datasets 418 accessed from voxel-based data structure 416 to create accurate lighting effects, even though light datasets 418 may not include image data ready for presentation to a user.

In the example of FIG. 9, audio frame times and video frame times are illustrated using two different timelines (two separate horizontal arrows stretching from left to right), but the lengths of these frame times are shown to be identical. In other words, the first audio frame time and the first video frame time are each the same length and correspond with the frame column labeled "Frame 1"; the second audio frame time and the second video frame time are each the same length and correspond with the frame column labeled "Frame 2"; and so forth. Accordingly, in this example, the video frame time and the audio frame time are of a same time duration (e.g., $\frac{1}{30}^{th}$ of a second in one example involving a 30 fps frame rate), such that the audio frame time is concurrent with an entirety of the video frame time (i.e., both frame times completely coincide with one another). It will be understood that in other examples, however, this unity of frame time between audio and video frames may not exist. For instance, in certain implementations, the video frame time and the audio frame time may be of different time durations (e.g., $\frac{1}{30}^{th}$ of a second for the video frame time and $\frac{1}{5}^{th}$ of a second for the audio frame time) such that the audio frame time is concurrent with only a portion of the video frame time (e.g., several audio frame times make up one video frame time) or only a portion of the audio frame time is concurrent with the video frame time (e.g., several video frame times make up one audio frame time). By setting the frame times of audio and video to be equal or having a specific relationship between the frame times (e.g., two-to-one, six-to-one, five-to-two, etc.), synchronization between audio and video may be facilitated.

As illustrated by the events occurring with the two different users (User 1 and User 2) with respect to the three different locations (Locations 1, 2, and 3) in FIG. 9, either a single user moving from location to location or two users at different locations may benefit from the location-centric audio and video content provided by system 100.

Specifically, as one example, voxel-based data structure 416 may include both: 1) a particular voxel within which a light dataset and an audio dataset are stored to represent an audiovisual experience at the particular location within the simulated 3D environment, and 2) an additional voxel within which an additional light dataset and an additional audio dataset are stored to represent an additional audiovisual experience at an additional location to which the additional voxel corresponds within the simulated 3D environment. System 100 (e.g., rendering facility 422) may then render audiovisual content (e.g., audiovisual content 424-1) for presentation, by way of an audiovisual presentation device 308, to a user 310 based on a position of an avatar of the user within the simulated 3D environment. The audiovisual content may provide the user, for instance, with the audiovisual experience at a particular time when the avatar is positioned at the particular location and may provide the user with the additional audiovisual experience when, at a later time, the avatar moves to be positioned at the additional location.

As another example, voxel-based data structure 416 may again include both: 1) the particular voxel within which the light dataset and the audio dataset are stored to represent the audiovisual experience at the particular location within the simulated 3D environment, and 2) the additional voxel within which the additional light dataset and the additional audio dataset are stored to represent the additional audiovisual experience at the additional location to which the additional voxel corresponds within the simulated 3D environment. In this example, system 100 (e.g., rendering facility 422) may render audiovisual content for presentation, by way of two respective audiovisual presentation devices 308, to a first user 310 and a second user 310 based on respective positions of a first avatar of the first user and a second avatar of the second user within the simulated 3D environment. The audiovisual content may provide the first user with the audiovisual experience at a particular time when the first avatar is positioned at the particular location and may provide the second user with the additional audiovisual experience at that same particular time when the second avatar is positioned at the additional location (i.e., such that the first and second users experience different content, including audio content, based on the different locations they have selected).

FIG. 9 illustrates these examples for User 1 and User 2 as different rendered content frames are presented to the users in time (as shown by audiovisual content 424-1 and 424-2 in section 902-3) as events involving the users occur (as shown along the timelines in section 902-2). Specifically, as shown, User 1 and User 2 are indicated to both be located at Location 1 during Frame 1 and Frame 2. As such, audiovisual content 424-1 and 424-2 both show that the same content is presented to Users 1 and 2 (i.e., "A-L1-F1" and "V-L1-F1" for frame 1, and "A-L1-F2" and "V-L1-F2" for Frame 2). Before the third frame time, however, the events in section 902-2 show that User 2 moves to Location 2, and this situation (in which User 1 is still at Location 1 and User 2 is at Location 2) persists for Frames 3, 4, and 5. Accordingly, as shown, while User 1 continues to be presented audio and video frames associated with Location 1 (i.e., audio frames "A-L1-F3", "A-L1-F4", and "A-L1-F5", and video frames "V-L1-F3", "V-L1-F4", and "V-L1-F5"), User 2 is now presented audio and video frames associated with Location 2 (i.e., audio frames "A-L2-F3", "A-L2-F4", and "A-L2-F5", and video frames "V-L2-F3", "V-L2-F4", and "V-L2-F5"). The audio and video frames then continue to be adjusted accordingly as User 2 moves to Location 3 for Frames 6, 7, and 8, and then moves back to Location 1 for Frames 9 and 10. At all times, both User 1 and User 2 are presented with content customized to their particular current location, even when that location changes.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 10:
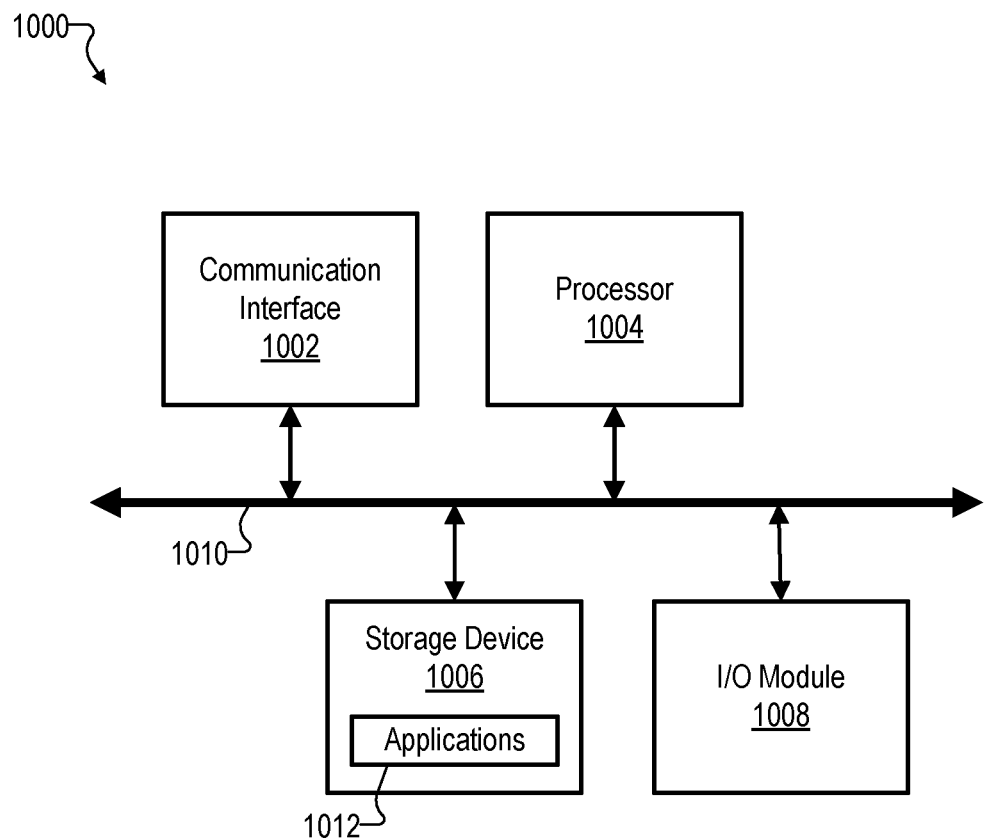
FIG. 10 shows an illustrative computing device that may implement audiovisual content rendering systems and/or other computing systems described herein.

FIG. 10 shows an illustrative computing device 1000 that may implement audiovisual content rendering systems and/or other computing systems described herein. For example, computing device 1000 may include or implement (or partially implement) an audiovisual content rendering system, a multi-access compute system such as multi-access cloud compute system 302 or MEC system 304, a user device such as any of audiovisual presentation devices 308, certain elements of network 306, and/or any other computing devices or systems described herein (or any elements or subsystems thereof).

As shown in FIG. 10, computing device 1000 may include a communication interface 1002, a processor 1004, a storage device 1006, and an input/output (I/O) module 1008 communicatively connected via a communication infrastructure 1010. While an illustrative computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with processor 104 of system 100. Likewise, memory 102 of system 100 may be implemented by or within storage device 1006.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
generating a light dataset configured to model light energy at a particular location within a simulated 3D environment for a video frame time, the light dataset representing chrominance and luminance characteristics configured for static rendering at the video frame time;
generating an audio dataset configured to model acoustic energy at the particular location within the simulated 3D environment for an audio frame time concurrent with the video frame time, the audio dataset representing pitch and amplitude characteristics configured for continuous rendering throughout the audio frame time; and
storing, together within a particular voxel of a voxel-based data structure, the light dataset and the audio dataset, wherein the particular voxel corresponds to the particular location within the simulated 3D environment.

2. The method of claim 1, wherein:
the light dataset is configured to model the light energy by applying a set of spherical harmonics functions to simulate propagating light waves interacting with simulated object surfaces in the simulated 3D environment; and
the audio dataset is configured to model the acoustic energy by applying the set of spherical harmonics functions to simulate propagating sound waves interacting with the simulated object surfaces in the simulated 3D environment.

3. The method of claim 1, further comprising accessing an environment dataset that includes data defining characteristics of the simulated 3D environment and a set of simulated object surfaces included in the simulated 3D environment;
wherein the generating of the light dataset and the generating of the audio dataset are performed based on the environment dataset.

4. The method of claim 1, wherein:
the audio dataset is generated based on a simulated propagation of sound waves, within the simulated 3D environment and by way of simulated object surfaces, from a sound source to the particular location;
the simulated propagation of the sound waves simulates physical interactions of the sound waves with the simulated object surfaces, the physical interactions including one or more of attenuation of the sound waves, reverberation of the sound waves, or distortion of the sound waves; and additional audio datasets associated with the simulated propagation of the sound waves are stored within additional voxels of the voxel-based data structure.

5. The method of claim 1, further comprising:

accessing, from the particular voxel of the voxel-based data structure, the light dataset and the audio dataset; and rendering, based on the accessing of the light dataset and the audio dataset, audiovisual content for presentation, by way of an audiovisual presentation device, to a user associated with an avatar positioned at the particular location within the simulated 3D environment.

6. The method of claim 1, wherein:

the voxel-based data structure includes:
  the particular voxel within which the light dataset and the audio dataset are stored to represent an audiovisual experience at the particular location within the simulated 3D environment, and
  an additional voxel within which an additional light dataset and an additional audio dataset are stored to represent an additional audiovisual experience at an additional location to which the additional voxel corresponds within the simulated 3D environment;

the method further comprises rendering audiovisual content for presentation, by way of an audiovisual presentation device, to a user based on a position of an avatar of the user within the simulated 3D environment; and the audiovisual content provides the user with the audiovisual experience at a particular time when the avatar is positioned at the particular location and provides the user with the additional audiovisual experience when, at a later time, the avatar moves to be positioned at the additional location.

7. The method of claim 1, wherein:

the voxel-based data structure includes:
  the particular voxel within which the light dataset and the audio dataset are stored to represent an audiovisual experience at the particular location within the simulated 3D environment, and
  an additional voxel within which an additional light dataset and an additional audio dataset are stored to represent an additional audiovisual experience at an additional location to which the additional voxel corresponds within the simulated 3D environment;

the method further comprises rendering audiovisual content for presentation, by way of respective audiovisual presentation devices, to a first user and a second user based on respective positions of a first avatar of the first user and a second avatar of the second user within the simulated 3D environment; and the audiovisual content provides the first user with the audiovisual experience at a particular time when the first avatar is positioned at the particular location and provides the second user with the additional audiovisual experience at the particular time when the second avatar is positioned at the additional location.

8. The method of claim 1, further comprising maintaining a machine learning model that is trained based on light data and audio data stored within the voxel-based data structure; wherein one or more of the following is true:

the generating of the light dataset is performed based on the audio dataset and the machine learning model, or the generating of the audio dataset is performed based on the light dataset and the machine learning model.

9. The method of claim 1, wherein the video frame time and the audio frame time are of a same time duration such that the audio frame time is concurrent with an entirety of the video frame time.

10. The method of claim 1, wherein the video frame time and the audio frame time are of different time durations such that the audio frame time is concurrent with only a portion of the video frame time or only a portion of the audio frame time is concurrent with the video frame time.

11. A system comprising:

a memory storing instructions; and one or more processors communicatively coupled to the memory and configured to execute the instructions to perform a process comprising:

generating a light dataset configured to model light energy at a particular location within a simulated 3D environment for a video frame time, the light dataset representing chrominance and luminance characteristics configured for static rendering at the video frame time;

generating an audio dataset configured to model acoustic energy at the particular location within the simulated 3D environment for an audio frame time concurrent with the video frame time, the audio dataset representing pitch and amplitude characteristics configured for continuous rendering throughout the audio frame time; and storing, together within a particular voxel of a voxel-based data structure, the light dataset and the audio dataset, wherein the particular voxel corresponds to the particular location within the simulated 3D environment.

12. The system of claim 11, wherein:

the light dataset is configured to model the light energy by applying a set of spherical harmonics functions to simulate propagating light waves interacting with simulated object surfaces in the simulated 3D environment; and the audio dataset is configured to model the acoustic energy by applying the set of spherical harmonics functions to simulate propagating sound waves interacting with the simulated object surfaces in the simulated 3D environment.

13. The system of claim 11, wherein:

the process further comprises accessing an environment dataset that includes data defining characteristics of the simulated 3D environment and a set of simulated object surfaces included in the simulated 3D environment; and the one or more processors perform the generating of the light dataset and the generating of the audio dataset based on the environment dataset.

14. The system of claim 11, wherein:

the audio dataset is generated based on a simulated propagation of sound waves, within the simulated 3D environment and by way of simulated object surfaces, from a sound source to the particular location;

the simulated propagation of the sound waves simulates physical interactions of the sound waves with the simulated object surfaces, the physical interactions including one or more of attenuation of the sound waves, reverberation of the sound waves, or distortion of the sound waves; and additional audio datasets associated with the simulated propagation of the sound waves are stored within additional voxels of the voxel-based data structure.

15. The system of claim 11, wherein the process further comprises:
accessing, from the particular voxel of the voxel-based data structure, the light dataset and the audio dataset; and
rendering, based on the accessing of the light dataset and the audio dataset, audiovisual content for presentation, by way of an audiovisual presentation device, to a user associated with an avatar positioned at the particular location within the simulated 3D environment.

16. The system of claim 11, wherein:
the voxel-based data structure includes:
the particular voxel within which the light dataset and the audio dataset are stored to represent an audiovisual experience at the particular location within the simulated 3D environment, and
an additional voxel within which an additional light dataset and an additional audio dataset are stored to represent an additional audiovisual experience at an additional location to which the additional voxel corresponds within the simulated 3D environment;
the process further comprises rendering audiovisual content for presentation, by way of an audiovisual presentation device, to a user based on a position of an avatar of the user within the simulated 3D environment; and
the audiovisual content provides the user with the audiovisual experience at a particular time when the avatar is positioned at the particular location and provides the user with the additional audiovisual experience when, at a later time, the avatar moves to be positioned at the additional location.

17. The system of claim 11, wherein:
the voxel-based data structure includes:
the particular voxel within which the light dataset and the audio dataset are stored to represent an audiovisual experience at the particular location within the simulated 3D environment, and
an additional voxel within which an additional light dataset and an additional audio dataset are stored to represent an additional audiovisual experience at an additional location to which the additional voxel corresponds within the simulated 3D environment;
the process further comprises rendering audiovisual content for presentation, by way of respective audiovisual presentation devices, to a first user and a second user based on respective positions of a first avatar of the first user and a second avatar of the second user within the simulated 3D environment; and
the audiovisual content provides the first user with the audiovisual experience at a particular time when the first avatar is positioned at the particular location and provides the second user with the additional audiovisual experience at the particular time when the second avatar is positioned at the additional location.

18. A non-transitory computer-readable medium storing instructions that, when executed, direct a processor of a computing device to perform a process comprising:
generating a light dataset configured to model light energy at a particular location within a simulated 3D environment for a video frame time, the light dataset representing chrominance and luminance characteristics configured for static rendering at the video frame time;
generating an audio dataset configured to model acoustic energy at the particular location within the simulated 3D environment for an audio frame time concurrent with the video frame time, the audio dataset representing pitch and amplitude characteristics configured for continuous rendering throughout the audio frame time; and
storing, together within a particular voxel of a voxel-based data structure, the light dataset and the audio dataset, wherein the particular voxel corresponds to the particular location within the simulated 3D environment.

19. The non-transitory computer-readable medium of claim 18, wherein:
the light dataset is configured to model the light energy by applying a set of spherical harmonics functions to simulate propagating light waves interacting with simulated object surfaces in the simulated 3D environment; and
the audio dataset is configured to model the acoustic energy by applying the set of spherical harmonics functions to simulate propagating sound waves interacting with the simulated object surfaces in the simulated 3D environment.

20. The non-transitory computer-readable medium of claim 18, wherein:
the audio dataset is generated based on a simulated propagation of sound waves, within the simulated 3D environment and by way of simulated object surfaces, from a sound source to the particular location;
the simulated propagation of the sound waves simulates physical interactions of the sound waves with the simulated object surfaces, the physical interactions including one or more of attenuation of the sound waves, reverberation of the sound waves, or distortion of the sound waves; and
additional audio datasets associated with the simulated propagation of the sound waves are stored within additional voxels of the voxel-based data structure.

\* \* \* \* \*